United States Patent
Liu et al.

(10) Patent No.: US 8,823,841 B2
(45) Date of Patent: Sep. 2, 2014

(54) METHOD AND APPARATUS FOR CORRECTING FOR VIGNETTING IN AN IMAGING SYSTEM

(75) Inventors: Chengming Liu, San Jose, CA (US); Donghui Wu, Sunnyvale, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 281 days.

(21) Appl. No.: 13/528,195

(22) Filed: Jun. 20, 2012

(65) Prior Publication Data

US 2013/0342741 A1 Dec. 26, 2013

(51) Int. Cl.
| | | |
|---|---|---|
| H04N 5/217 | (2011.01) | |
| H04N 5/228 | (2006.01) | |
| H04N 5/225 | (2006.01) | |
| H04N 5/232 | (2006.01) | |
| G03B 13/00 | (2006.01) | |
| G06K 9/00 | (2006.01) | |
| G06K 9/46 | (2006.01) | |
| G06K 9/66 | (2006.01) | |
| G06K 9/40 | (2006.01) | |
| G06K 9/36 | (2006.01) | |

(52) U.S. Cl.
USPC ..... 348/241; 348/222.1; 348/345; 348/218.1; 382/190; 382/254; 382/167; 382/274

(58) Field of Classification Search
CPC ......... H04N 5/357; H04N 5/217; G06T 5/006
USPC .......................... 348/222.1, 218.1, 280, 345; 382/162–167; 352/71
See application file for complete search history.

(56) References Cited

U.S. PATENT DOCUMENTS

| | | | |
|---|---|---|---|
| 6,833,862 B1 | 12/2004 | Li | |
| 7,453,502 B2 * | 11/2008 | Schweng | 348/241 |
| 7,548,661 B2 * | 6/2009 | Lin et al. | 382/274 |
| 7,692,700 B2 * | 4/2010 | Johannesson et al. | 348/251 |
| 7,920,171 B2 * | 4/2011 | Hu | 348/222.1 |
| 8,406,557 B2 * | 3/2013 | Park et al. | 382/274 |
| 8,451,339 B2 * | 5/2013 | Solomon | 348/222.1 |
| 8,675,987 B2 * | 3/2014 | Agarwaia et al. | 382/275 |
| 8,724,007 B2 * | 5/2014 | Chen et al. | 348/345 |
| 2005/0179793 A1 | 8/2005 | Schweng | |
| 2007/0146506 A1 | 6/2007 | Lin et al. | |
| 2007/0211154 A1 * | 9/2007 | Mahmoud et al. | 348/251 |
| 2009/0021632 A1 * | 1/2009 | Huggett | 348/349 |
| 2009/0022421 A1 * | 1/2009 | Uyttendaele et al. | 382/284 |
| 2012/0105686 A1 * | 5/2012 | Agarwala et al. | 348/240.99 |

* cited by examiner

*Primary Examiner* — Timothy J Henn
*Assistant Examiner* — Pritham Prabhakher
(74) *Attorney, Agent, or Firm* — Lathrop & Gage LLP

(57) ABSTRACT

A method and apparatus for correcting for vignetting include associating each pixel in the two-dimensional array with a pair of polar coordinates referenced to a preselected origin pixel and partitioning the two-dimensional array of image pixels into a plurality of sectors. For each sector, the method includes computing an average R value, an average G value and an average B value; converting the average R value, the average G value and the average B value for each sector to logarithm space; comparing color gradients along a radial sector line to a gradient threshold; selecting gradients that do not exceed the threshold; using the selected gradients, estimating parameters of a model of a lens which produced the image; and, using the parameters, updating the model of the lens and correcting the image.

13 Claims, 5 Drawing Sheets

METHOD AND APPARATUS FOR CORRECTING FOR VIGNETTING IN AN IMAGING SYSTEM

BACKGROUND

1. Technical Field

This disclosure relates to optical imaging systems and, more particularly, to a method and apparatus for correcting for color and/or intensity vignetting in an image and in the imaging system which generated the image.

2. Discussion of the Related Art

Digital imaging systems typically include an optical system for gathering and projecting or imaging light onto a receiver, detector or sensor. The optical system typically includes one or more imaging lenses for forming the image on the sensor. The sensor is commonly a two-dimensional array of optical detectors or sensors, such as complementary metal-oxide-semiconductor (CMOS) image sensors.

Vignetting is a common phenomenon which occurs in optical systems. It refers to the color and intensity variation with respect to the lens' chief ray angle. As the chief ray angle increases, the quantum efficiency of the sensors or detectors decreases, resulting in a decrease in the color and intensity as the distance from the center of the image increases.

Many approaches to correcting for the vignetting artifact have been introduced. Most correction methods require specific scenes for calibration, which usually must be uniformly lit, and the calibrated model is applied to the real image or video. In practice, the vignetting model actually changes with light spectrum and focal length, which is difficult to calibrate across different light sources. This phenomenon is more pronounced in CMOS image sensors with small pixel size. Other approaches work on a single image individually and require image segmentation and a large buffer, which is too complex to embed in an image sensor.

SUMMARY

According to a first aspect, a method for correcting for vignetting in an image is provided. The image includes a two-dimensional array of image pixels, each image pixel comprising an R value, a G value and a B value representative of red, green and blue intensities, respectively. According to the method, each pixel in the two-dimensional array is associated with a pair of polar coordinates referenced to a preselected origin pixel. The two-dimensional array of image pixels is partitioned into a plurality of sectors, each sector comprising a plurality of pixels of the two-dimensional array of image pixels, the plurality of sectors comprising a plurality of groups of sectors, each group of sectors extending radially along an associated sector line through the preselected origin pixel. For each group of sectors: (i) for each sector in the group of sectors, an average R value, an average G value and an average B value are computed, the average R value being an average of the R values of the pixels in the sector, the average G value being an average of the G values of the pixels in the sector, the average G value being an average of the G values of the pixels in the sector; (ii) the average R value, the average G value and the average B value for each sector are converted to logarithm space to generate an R vector, a G vector and a B vector; (iii) a median filter is applied to the R vector, the G vector and the B vector to identify color gradients along the sector line; (iv) the color gradients are compared to a gradient threshold; (v) gradients that do not exceed the threshold are selected; (vi) parameters of a model of a lens which produced the image are estimated using the selected gradients; and (vi) the model of the lens is updated and the image is corrected using the parameters.

According to another aspect, an image sensor with correction for vignetting comprises: a two-dimensional array of image pixels, each image pixel comprising an R value, a G value and a B value representative of red, green and blue intensities, respectively; and a processing circuit coupled to the two-dimensional array of pixels. The processing circuit is adapted to: (i) associate each pixel in the two-dimensional array with a pair of polar coordinates referenced to a preselected origin pixel, (ii) partition the two-dimensional array of image pixels into a plurality of sectors, each sector comprising a plurality of pixels of the two-dimensional array of image pixels, the plurality of sectors comprising a plurality of groups of sectors, each group of sectors extending radially along an associated sector line through the preselected origin pixel, and (iii) for each group of sectors, for each sector in the group of sectors: compute an average R value, an average G value and an average B value, the average R value being an average of the R values of the pixels in the sector, the average G value being an average of the G values of the pixels in the sector, the average G value being an average of the G values of the pixels in the sector: convert the average R value, the average G value and the average B value for each sector to logarithm space to generate an R vector, a G vector and a B vector; apply a median filter to the R vector, the G vector and the B vector to identify color gradients along the sector line; compare the color gradients to a gradient threshold; select gradients that do not exceed the threshold; using the selected gradients, estimate parameters of a model of a lens which produced the image; and using the parameters, update the model of the lens and correct the image.

BRIEF DESCRIPTION OF THE DRAWINGS

The foregoing and other features and advantages will be apparent from the more particular description of preferred embodiments, as illustrated in the accompanying drawings in which like reference characters refer to the same parts throughout the different views. The drawings are not necessarily to scale. In the drawings, the sizes of features may be exaggerated for clarity.

DETAILED DESCRIPTION

Figure 1A:
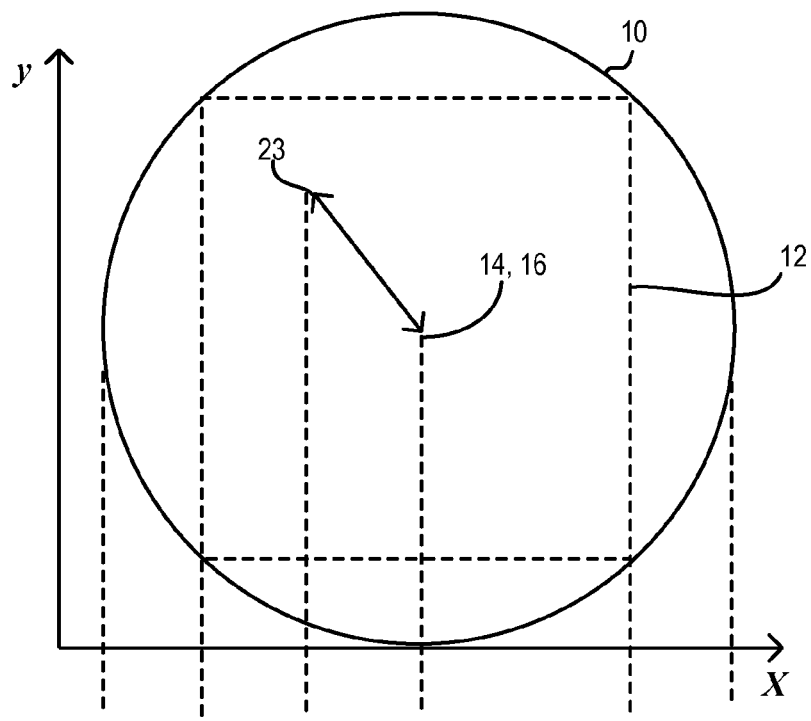
FIGS. 1A and 1B are schematic diagrams of basic components of an imaging system.
Figure 1B:
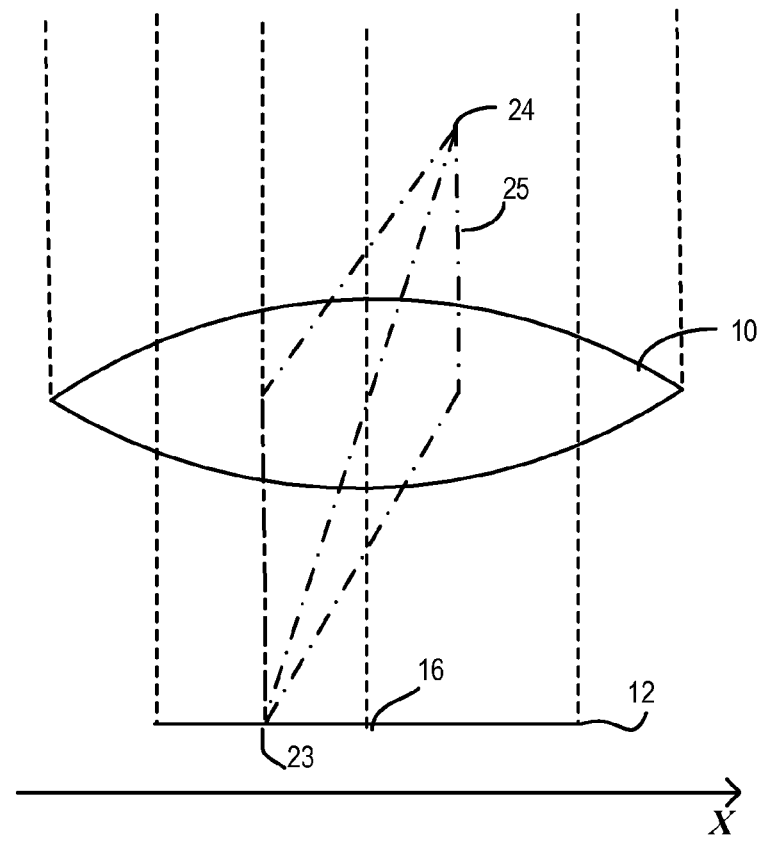

FIGS. 1A and 1B are schematic diagrams of basic components of an imaging system. Specifically, FIG. 1A is a top view of the illustrated imaging system components, and FIG. 1B is a side view of the components. The components include a lens 10 and a sensor array 12. The center 14 of lens 10 is in alignment with a center pixel 16 of sensor array 12. Pixels in sensor array 12 can be located according to a Cartesian coordinate system defined by mutually orthogonal x and y axes, such that each pixel 23 in sensor array 12 is associated with a Cartesian coordinate pair indicted by (x, y). Specifically, center pixel 16 of sensor array 12 can be identified by the coordinate pair ($x_{center}$, $y_{center}$).

As noted above, in general, pixel 23 is associated with a Cartesian coordinate pair referred to as (x, y). Referring to FIG. 1B, light ray traces 25 from a point 24 in an object or scene being imaged pass through lens 10 and are joined together at pixel 23 of sensor array 12. Generally, lens shading or vignetting at a pixel having coordinates (x, y) is related to the distance in sensor array 12 between center pixel 16 having coordinates ($x_{center}$, $y_{center}$) and pixel 23 having coordinates (x, y).

Figure 2:
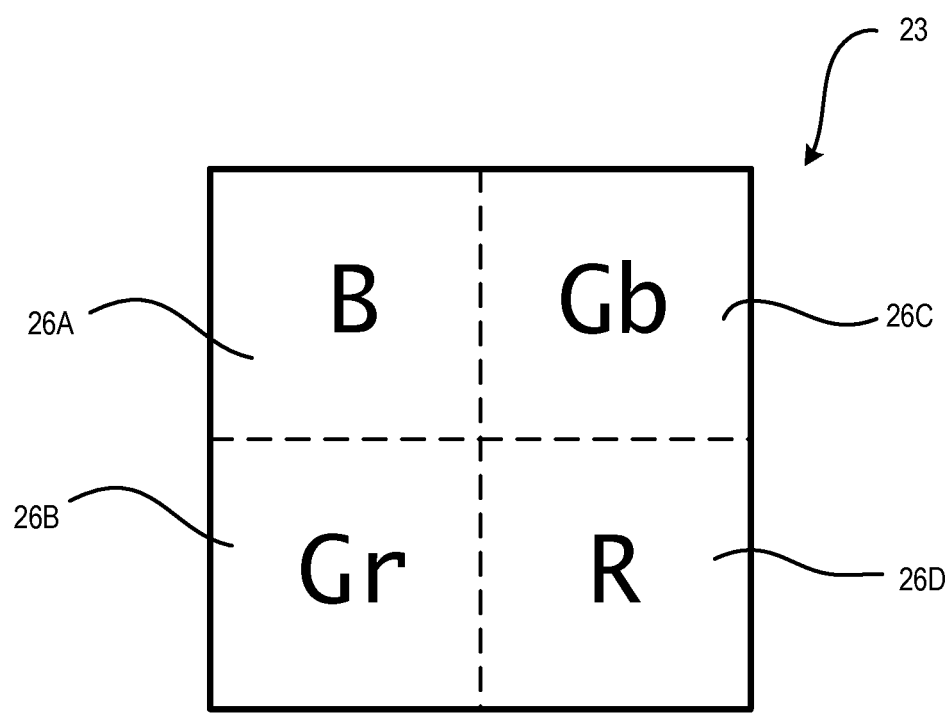
FIG. 2 is a schematic diagram of a typical pixel in a sensor array.

FIG. 2 is a schematic diagram of a typical pixel 23 in sensor array 12. Referring to FIG. 2, each pixel 23 in sensor array 12 is actually made up of, in one particular exemplary embodiment, four optical detectors 26A, 26B, 26C, 26D disposed in a 2×2 cell. Each 2×2 cell in sensor array 12 is treated as a single pixel 23. Within the 2×2 cell, each detector 26 is associated with a specific filter color. In this specific exemplary illustration, detector 26A is filtered by a blue filter B, detector 26B is filtered by a green filter Gr, detector 26C is filtered by another green filter Gb, and detector 26D is filtered by a red filter R. Each detector 26 generates an intensity value for pixel 23. Specifically, detector 26A generates a blue intensity value B for pixel 23, detector 26B generates a first green intensity value Gr for pixel 23, detector 26C generates a second green intensity value Gb for pixel 23, and detector 26D generates a red intensity value R for pixel 23. In this exemplary illustration, the green intensity value G for pixel 23 is the average of the first and second green intensity values Gr and Gb, that is, G=(Gr+Gb)/2. Therefore, each pixel 23 in sensor array 12 includes red, green and blue intensity values R, G, B.

Figure 3:
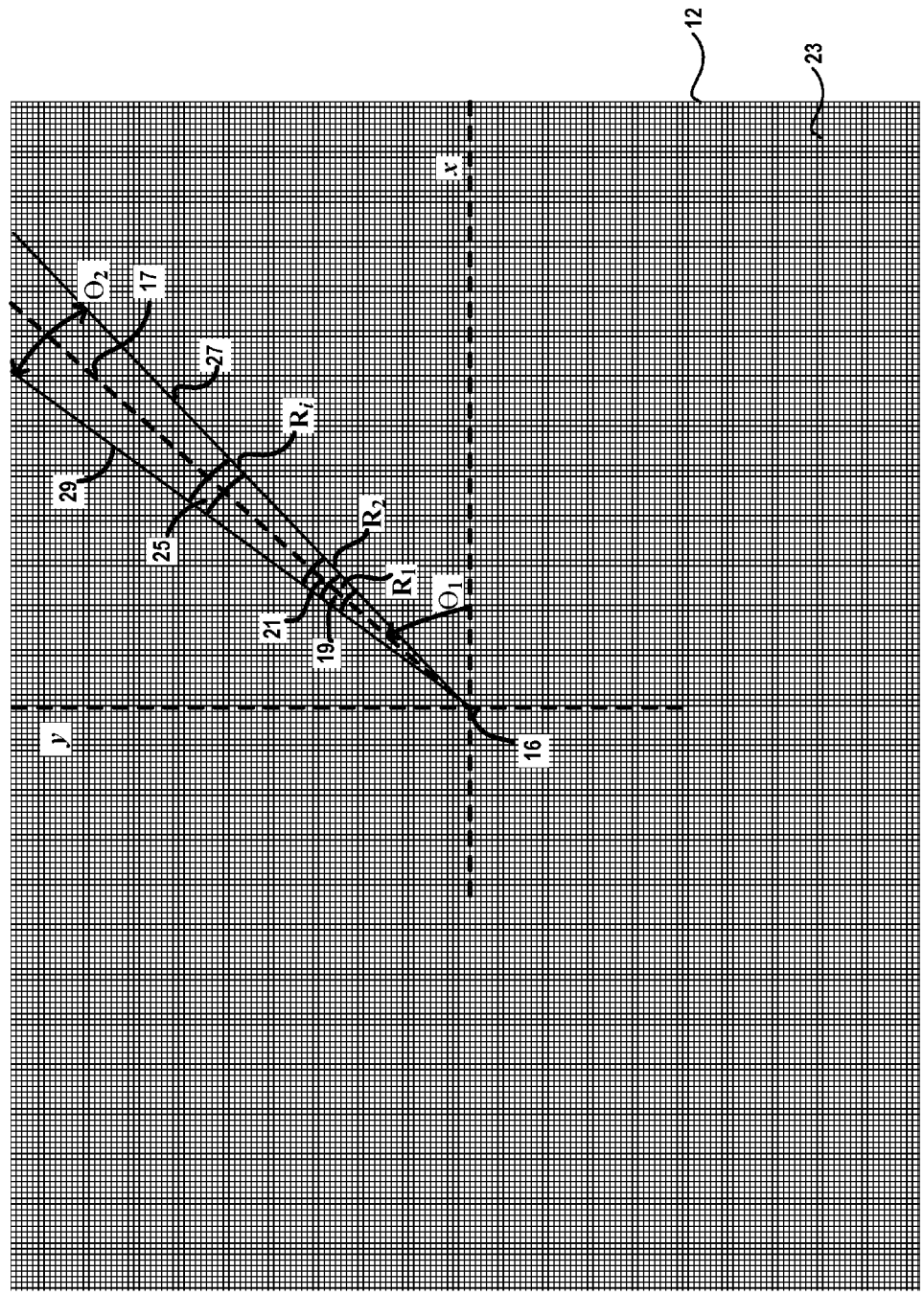
FIG. 3 contains a schematic plan view diagram of a two-dimensional sensor array, according to exemplary embodiments.

FIG. 3 contains a schematic plan view diagram of two-dimensional sensor array 12, according to exemplary embodiments. Sensor array 12 includes a two-dimensional array of pixels 23 which include data that are representative of an image of an object or scene. Each pixel 23 includes data for at least three color intensities. For example, each pixel includes intensity data for red, green and blue (R, G, B) intensities, as described above in detail. It should be noted that throughout this disclosure, the colors red, green, and blue (R, G, B) are used only for exemplary illustration. This disclosure is also applicable to other combinations of colors, such as cyan, yellow, magenta and red, green, blue, white color combinations, among others.

In general, the data associated with pixels 23 of sensor array 12 represent an image with a lens shading or vignetting artifact. According to exemplary embodiments, the image data of pixels 23 are corrected and/or updated to substantially reduce or eliminate the lens shading or vignetting artifact. In addition, a lens model applied to the data to identify the lens shading or vignetting artifact is also corrected/updated.

Referring to FIG. 3, as described above in detail, each pixel 23 is associated with a Cartesian coordinate pair (x, y), defined by the mutually orthogonal x and y axes. Sensor array 12 also includes a center pixel 16 whose Cartesian coordinate pair is referred to herein as ($x_{center}$, $y_{center}$). According to exemplary embodiments, in the process of correcting for the lens shading or vignetting artifact, the coordinates of each pixel 23 are converted to polar coordinates such that the position of each pixel 23 is defined by a polar coordinate pair (r, θ), where r is the distance of pixel 23 from center pixel 16, which is defined as an origin pixel for the polar coordinate system, and θ is the angle which a line passing through origin pixel or center pixel 16 and pixel 23 forms with the horizontal or x axis.

According to exemplary embodiments, a plurality of radial sector lines 17, which extend radially from origin pixel or center pixel 16 and form an angle $\theta_1$ with the horizontal, i.e., x, axis, is defined. A plurality of sectors 19, 21, 25 are disposed along each radial sector line 17. Sectors 19, 21, 25 are groups of pixels 23 bounded as illustrated by radial boundary lines 27 and 29 and radially by a predefined radial sector thickness. Each sector 19, 21, 25 is defined by a certain predetermined distance $R_i$ from center pixel 16. For example, sector 19 is defined as being a distance $R_1$ from center pixel 16, and adjacent sector 21 is defined as being a distance $R_2$ from center pixel 16.

The size of each sector 25, and, therefore, the number of pixels 23 in each sector 25, is determined by the radial thickness of each sector 25, which is determined by the distance $R_i$ of sectors 25 from center pixel 16, as well as the angle $\theta_2$ separating radial boundary lines 27 and 29. Either or both of these parameters of the sectors, i.e., the radial thickness and the angle $\theta_2$, can be selected based on the desired precision of the image correction being performed, according to some embodiments.

Referring to FIG. 3, it will be understood that while only one radial sector line 17 is illustrated for the purpose of clarity of the illustration, many radial sector lines 17 are defined according to exemplary embodiments, such that sectors 25 are defined over the entire sensor array 12. Also, it will be understood that while only two adjacent sectors 19 and 21 and one general sector 25 are illustrated along radial sector line 17, many adjacent sectors are actually defined, such that, in some exemplary embodiments, sectors 25 are defined extending radially and radially adjacent to each other from origin or center pixel 16 to the edge of sensor array 12.

Figure 4:
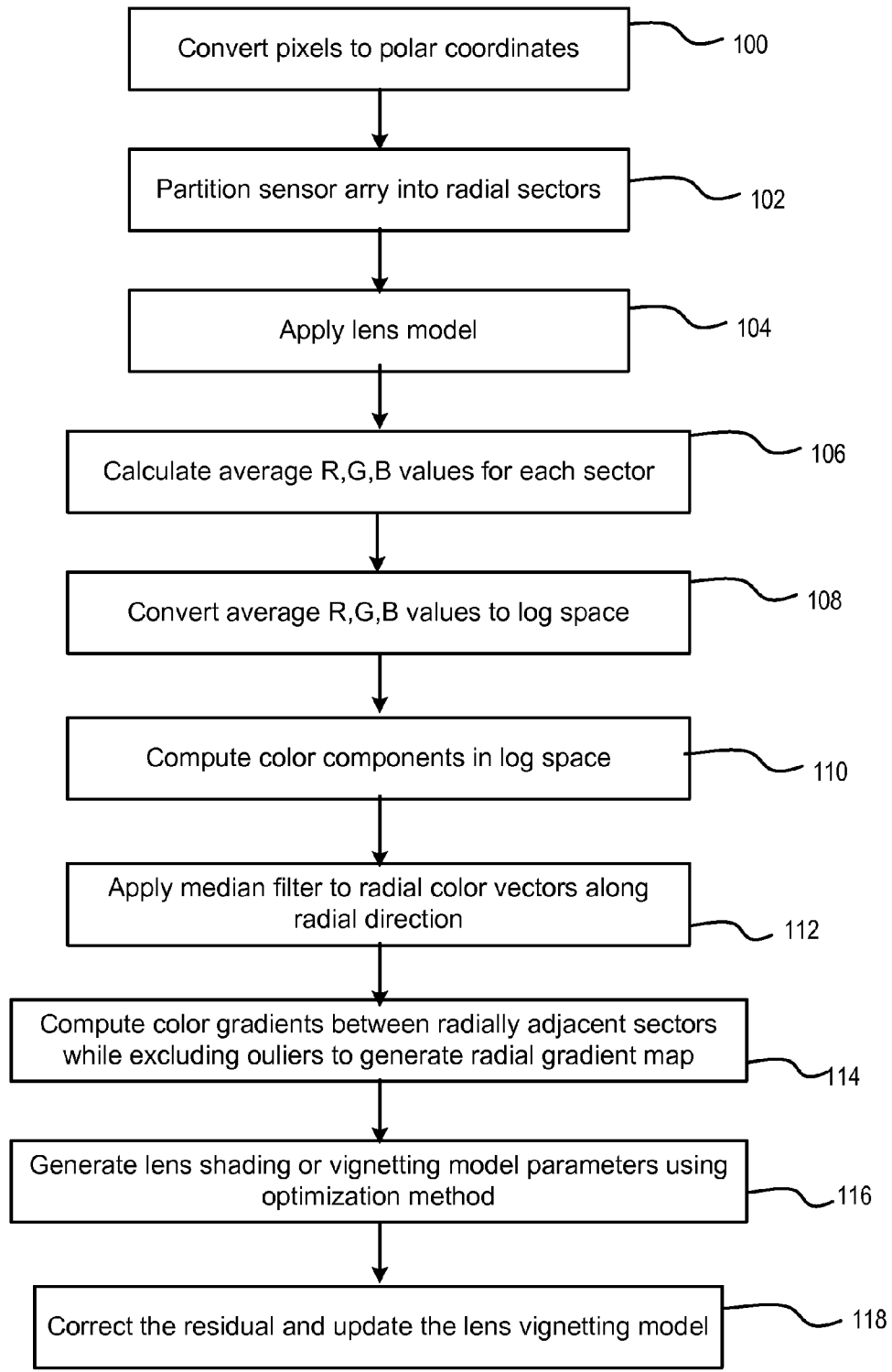
FIG. 4 is a schematic logical flow diagram which illustrates the process of correcting for lens shading or vignetting in image data, according to some exemplary embodiments.

FIG. 4 is a schematic logical flow diagram which illustrates the process of correcting for lens shading or vignetting in image data and correcting and updating a lens model, according to some exemplary embodiments. Referring to FIG. 4, as described above, the coordinates of each pixel 23 are converted to polar coordinates in step 100, and the polar coordinates for each pixel 23 are stored. Next, in step 102, sensor array 12 is partitioned into radial sectors 25. As described in detail above, each sector 25 is defined along a radial sector line 17. The size of each sector 25 is determined according to the desired precision. That is, high precision would require a relatively higher quantity of smaller sectors 25 than low precision would require.

In step 104, the lens model is applied. The lens model may be the model that was updated by the processing of a previous group of radial sectors 25 along a radial sector line 17. That is, the lens shading is corrected in the image using the lens model estimated and updated during the processing of the disclosure in connection with a previous group of sectors 25 along radial sector line 17, and then the lens model is updated using the residual shading developed during the processing of the present group of sectors 25.

In step 106, the average R, G and B values for each sector 25 are computed and stored. The average R value for a sector is the average of the R values of all of the pixels in the sector. Similarly, the average G value for a sector is the average of the G values of all of the pixels in the sector, and the average B value for a sector is the average of the B values of all of the pixels in the sector.

In step 108, the average R, G and B values are converted to log space. Next, in step 110, the color components of each sector 25 are computed in log space. That is, for example, the red color content is computed in color space by dividing the average red value R for a sector by the average green value G for the sector by subtracting the respective converted logarithmic values. That is, R/G=log (R)−log (G). Similarly, the blue color content is computed in color space by dividing the average blue value B for a sector by the average green value G for the sector by subtracting the respective converted logarithmic values. That is, B/G=log (B)−log (G). In some exemplary embodiments, sectors having values that are too low are concluded to be dark and are excluded. Similarly, sectors with color content values that are too high, i.e., saturated, are also excluded. The remaining color content values are used to generate radial color vectors, for example, a red radial color vector and a blue radial color vector, for each radial sector line 17.

Next, in step 112, a median filter is applied to each radial color vector along the radial direction to remove noise from the data for each sector 25. Next, in step 114, color gradients between radially adjacent sectors 25 are obtained for each radial color vector by subtracting corresponding color content values of adjacent sectors 25. According to some embodiments, gradients caused by lens shading or vignetting are distinguished from actual image contents, since color edges of objects will result in inaccurate estimation and correction. To accomplish this, since gradients caused by edges of actual objects are substantially larger than gradients caused by lens shading or vignetting, outlier gradients, i.e., gradients above a certain threshold or outside of a certain predetermined range, are eliminated from the processing. This is described in detail below. The result of computing all of the gradients and excluding the outlier gradients is generation of a radial gradient map for the image.

Next, in step 116, according to exemplary embodiments, lens shading or vignetting model parameters are computed, i.e., estimated, in order to update the lens shading or vignetting model and to correct the image data to eliminate or reduce the vignetting artifact. In exemplary embodiments, this is accomplished by applying an optimization technique. Most commonly, color vignetting does not result in dramatic changes or substantial gradients. Therefore, according to some exemplary embodiments, a second-order, i.e., quadratic, polynomial is used to model the lens vignetting. According to other exemplary embodiments, the model can be expanded to higher-order polynomials. The quadratic polynomial can be of the form, $$Y = C - a_1 r - a_2 r^2 \quad (1);$$

where C is a reference constant, e.g., the color intensity of center pixel 16, r is the radius or distance from center pixel 16, Y is the color content value, i.e., either blue (B) or red (R) in exemplary embodiments, and $a_1$ and $a_2$ are model parameters which are estimated according to exemplary embodiments.

A first derivative with respect to radius or distance r is applied to (1) to obtain, $$-Y' = a_1 + 2a_2 r \quad (2);$$

which describes color content gradient with respect to r. These model parameters are estimated using the radial gradient map by applying, in some exemplary embodiments, linear regression. Referring to step 118, once the model parameters $a_1$ and $a_2$ are obtained using linear regression, the residual, i.e., the shading of the image in the processing of the present group of radial sectors, is corrected and the lens vignetting model is updated by adding back $(a_1+a_2 r)$ to the model polynomial (1) above. The addition operation in log space is multiplication in linear space, so the ratio can be calculated by converting back from log space to linear space.

For example, according to some exemplary embodiments, for a pixel with a radius (radial distance) r from center pixel 16, with the model parameters $a_1$ and $a_1$, the color Y=C−$a_1$r−$a_2 r^2$ can be estimated, where C is the color at center pixel 16. According to exemplary embodiments, to correct Y to equal C, then Y'=Y+$a_1 r+a_2 r^2$=C. In log space, $a_1 r+a_2 r^2$ is added to correct the shading at the current pixel. In linear space, a gain, R'/G' is multiplied, i.e., R'/G'=Gain×R/G. Log(R'/G')=log(R/G)+log(Gain), where log(Gain)=$a_1 r+a_2 r^2$. Then, Gain can be computed by Gain=exp($a_1 r+a_2 r^2$). For example, to correct the red color shading, R'=Gain×R. To correct the blue shading, B'=Gain×B, As described above, according to exemplary embodiments, radial gradients are distinguished based on whether they are due to lens vignetting or actual object edges or boundaries. Because the color edges of objects can result in false estimation, according to exemplary embodiments, the boundaries of the model parameters can be defined as $a_{1min}$, $a_{1max}$, $a_{2min}$, $a_{2max}$, because color variance caused by vignetting is much smaller than that caused by actual object edges. With the model parameters $a_1$ and $a_2$ bounded, then the gradients can be bounded according to the following:

$$G_{min} = a_{1min} + a_{2min} r \quad (3); \text{ and}$$

$$G_{max} = a_{1max} + a_{2max} r \quad (4).$$

Then, the outliers, i.e., the gradients that are not due to vignetting, can be identified by applying the gradients G to the range $G_{min} < G < G_{min}$, and excluding any gradients that lie outside of the range.

According to some exemplary embodiments, computation of gradients between multiple radial sectors 25 can be used to smooth out noise. For example, computation of gradients between two radial sectors separated by a radial distance can have the effect of smoothing noise. For example, given a vector [x0, x1 x2, x3], the normal gradient is x1−x0, x3−x2. Using two radial sectors 25 separated by a radial distance, the gradient can be computed as (x2−x1)/2, (x3−x1)/2.

According to some exemplary embodiments, a time-division approach can be used to reduce the size of the buffer used to store data used in the computations according to the disclosure. That is, for example, two frames can be used to estimate the lens model. For example, the polar image can be portioned as [64,24], i.e., the resolution in radius r for the sectors 25 is 64, and the total 360-degree angle is partitioned into 24 angular regions, i.e., $\theta_2$=15 degrees for each sector line 17 (see FIG. 3). Under this time-division approach, only the vectors for odd angles are processed, and, in the second frame, only even angles are processed. This reduces by half the required data storage load.

Figure 5:
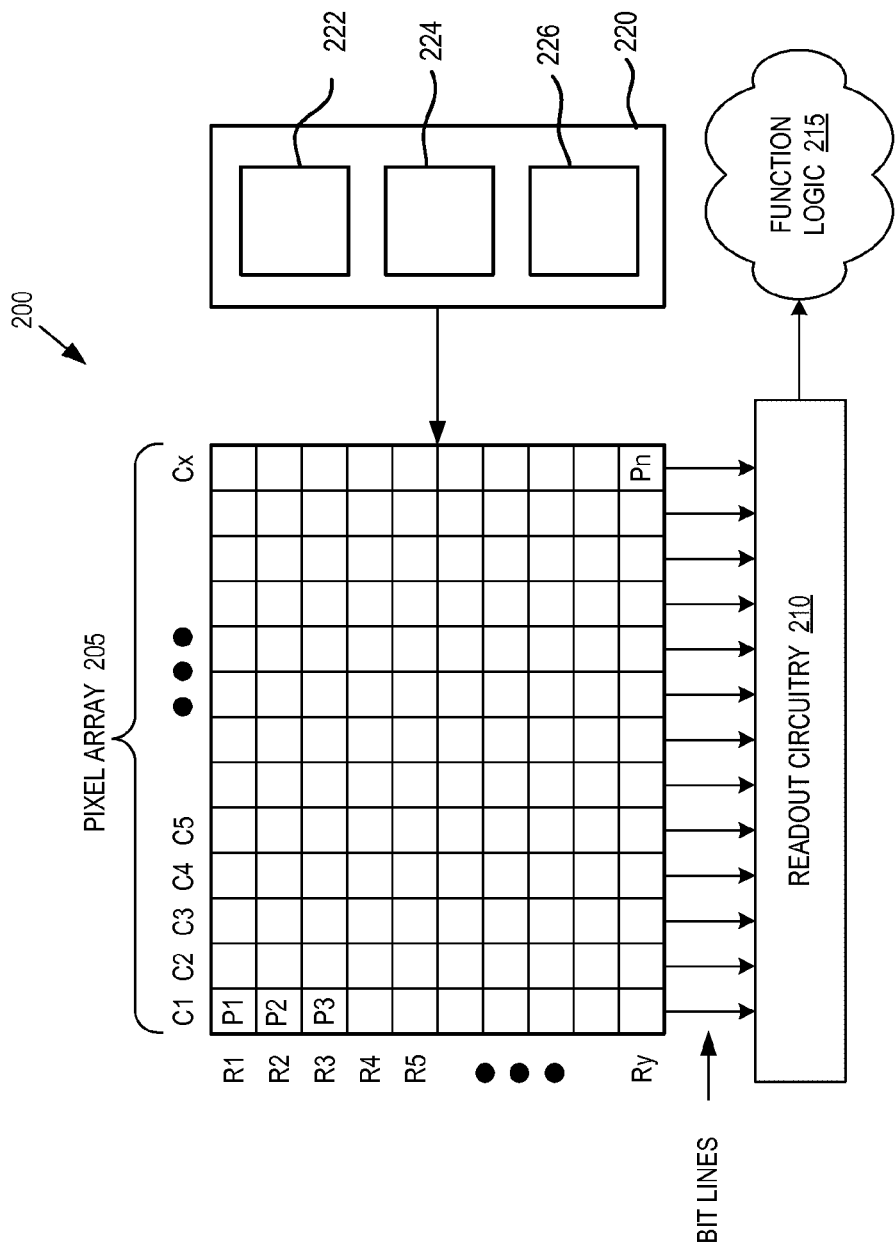
FIG. 5 contains a schematic functional block diagram of an image sensor according to exemplary embodiments.

FIG. 5 contains a schematic functional block diagram of an image sensor 200 according to exemplary embodiments. Referring to FIG. 5, image sensor 200 includes a pixel array or sensor array 205, described above as sensor array 12. Pixel array 205 interfaces via bit lines with readout circuitry 210. Readout circuitry 210 provides data from pixel array 205 to function logic 215.

Pixel array 205 interfaces with and is controlled in accordance with the foregoing detailed description by processing circuitry 220. To that end, processing circuitry 220 includes all of the circuitry required to carry out the operation of an imaging system according to the present disclosure. For example, processing circuitry 220 can include a processor 222, one or more memory or storage circuits 224 and one or more input/output interface circuits 226.

It is noted that the forgoing disclosure refers primarily to color vignetting and correction for color vignetting. It will be understood from the foregoing that the disclosure is also applicable to intensity vignetting. For example, as described above in detail, for color vignetting correction, R/G and B/G are corrected. For intensity vignetting correction, processing is performed on G or Y=(R+2G+B)/4. The process is the same as that described above in detail in connection with color vignetting correction.

Combinations of Features

In any of the embodiments described in detail and/or claimed herein, estimating the parameters can include applying linear regression.

In any of the embodiments described in detail and/or claimed herein, the model is a polynomial model.

In any of the embodiments described in detail and/or claimed herein, the model is a quadratic polynomial model.

In any of the embodiments described in detail and/or claimed herein, the parameters are obtained from a first derivative of the quadratic polynomial.

In any of the embodiments described in detail and/or claimed herein, the origin pixel is at an optical center of the image.

In any of the embodiments described in detail and/or claimed herein, the processing circuit comprises a memory.

In any of the embodiments described in detail and/or claimed herein, the processing circuit comprises a processor.

While the present disclosure has shown and described exemplary embodiments, it will be understood by those of ordinary skill in the art that various changes in form and details may be made therein without departing from the spirit and scope of the present disclosure, as defined by the following claims.

The invention claimed is:

1. A method for correcting for vignetting in an image, the image comprising a two-dimensional array of image pixels, each image pixel comprising an R value, a G value and a B value representative of red, green and blue intensities, respectively, the method comprising:
    associating each pixel in the two-dimensional array with a pair of polar coordinates referenced to a preselected origin pixel;
    partitioning the two-dimensional array of image pixels into a plurality of sectors, each sector comprising a plurality of pixels of the two-dimensional array of image pixels, the plurality of sectors comprising a plurality of groups of sectors, each group of sectors extending radially along an associated sector line through the preselected origin pixel;
    for each group of sectors:
        for each sector in the group of sectors, computing an average R value, an average G value and an average B value, the average R value being an average of the R values of the pixels in the sector, the average G value being an average of the G values of the pixels in the sector, the average G value being an average of the G values of the pixels in the sector;
        converting the average R value, the average G value and the average B value for each sector to logarithm space to generate an R vector, a G vector and a B vector;
        applying a median filter to the R vector, the G vector and the B vector to identify color gradients along the sector line;
        comparing the color gradients to a gradient threshold;
        selecting gradients that do not exceed the threshold;
        using the selected gradients, estimating parameters of a model of a lens which produced the image; and using the parameters, updating the model of the lens and correcting the image.

2. The method of claim 1, wherein estimating the parameters comprises applying linear regression.

3. The method of claim 1, wherein the model is a polynomial model.

4. The method of claim 1, wherein the model is a quadratic polynomial model.

5. The method of claim 4, wherein the parameters are obtained from a first derivative of the quadratic polynomial.

6. The method of claim 1, wherein the origin pixel is at an optical center of the image.

7. An image sensor with correction for vignetting, comprising:
    a two-dimensional array of image pixels, each image pixel comprising an R value, a G value and a B value representative of red, green and blue intensities, respectively; and
    a processing circuit coupled to the two-dimensional array of pixels, the processing circuit being adapted to:
        associate each pixel in the two-dimensional array with a pair of polar coordinates referenced to a preselected origin pixel,
        partition the two-dimensional array of image pixels into a plurality of sectors, each sector comprising a plurality of pixels of the two-dimensional array of image pixels, the plurality of sectors comprising a plurality of groups of sectors, each group of sectors extending radially along an associated sector line through the preselected origin pixel,
        for each group of sectors:
            for each sector in the group of sectors, compute an average R value, an average G value and an average B value, the average R value being an average of the R values of the pixels in the sector, the average G value being an average of the G values of the pixels in the sector, the average G value being an average of the G values of the pixels in the sector,
            convert the average R value, the average G value and the average B value for each sector to logarithm space to generate an R vector, a G vector and a B vector,
            apply a median filter to the R vector, the G vector and the B vector to identify color gradients along the sector line,
            compare the color gradients to a gradient threshold,
            select gradients that do not exceed the threshold,
            using the selected gradients, estimate parameters of a model of a lens which produced the image, and
            using the parameters, update the model of the lens and correct the image.

8. The image sensor of claim 7, wherein the processing circuit comprises a memory.

9. The image sensor of claim 7, wherein the processing circuit comprises a processor.

10. The image sensor of claim 7, wherein the model is a polynomial model.

11. The image sensor of claim 7, wherein the model is a quadratic polynomial model.

12. The image sensor of claim 11, wherein the parameters are obtained from a first derivative of the quadratic polynomial.

13. The image sensor of claim 7, wherein the origin pixel is at an optical center of the image.

* * * * *